United States Patent
Balan et al.

(10) Patent No.: US 11,652,439 B2
(45) Date of Patent: May 16, 2023

(54) SYSTEM FOR MOUNTING TILES

(71) Applicant: Arka Energy Inc., Union City, CA (US)

(72) Inventors: Priyesh Balan, Kerala (IN); Mahadeva Prasad H S, Karnataka (IN)

(73) Assignee: ARKA ENERGY INC., Union City, CA (US)

(*) Notice: Subject to any disclaimer, the term of this patent is extended or adjusted under 35 U.S.C. 154(b) by 0 days.

(21) Appl. No.: 17/848,476

(22) Filed: Jun. 24, 2022

(65) Prior Publication Data
US 2023/0008787 A1 Jan. 12, 2023

(30) Foreign Application Priority Data
Jul. 7, 2021 (IN) .............................. 202111030557

(51) Int. Cl.
*H02S 20/25* (2014.01)
*H02S 40/42* (2014.01)
*H02S 20/10* (2014.01)
*H02S 30/10* (2014.01)

(52) U.S. Cl.
CPC .............. *H02S 20/25* (2014.12); *H02S 30/10* (2014.12); *H02S 40/425* (2014.12)

(58) Field of Classification Search
CPC .......... H02S 20/25; H02S 30/10; H02S 40/425
See application file for complete search history.

(56) References Cited

U.S. PATENT DOCUMENTS

2014/0102518 A1* 4/2014 Chihlas ................. H01L 31/048
136/251

* cited by examiner

*Primary Examiner* — Jayne L Mershon
(74) *Attorney, Agent, or Firm* — Dority & Manning, P.A.

(57) ABSTRACT

The present disclosure relates to a simple, lightweight, cost-effective, aesthetically pleasing, and strong system for mounting solar panel tiles (or other tiles/panels) over a roof (surface). The system includes frames (footage) parallelly positioned over the surface using reference bars passing through the frames, and bolts/screws to couple the frames to the surface. The frames include C-shaped grooves at both ends. Each groove is configured with a flat spring that is coupled to the grooves using a spring fixing bracket. Further, Z-shaped clamps are coupled at the bottom surface of the tiles to form a tile assembly. The spring is adapted to be pressed upon application of a force while mounting the tile assembly in the frames, which allows one side of the tile assembly, and the Z-shaped clamp on the other side of the tile assembly to be accommodated and locked in the two opposite C-shaped grooves of the frames.

10 Claims, 8 Drawing Sheets

SYSTEM FOR MOUNTING TILES

TECHNICAL FIELD

The present disclosure relates to the field of panel mounting systems. More particularly, the present disclosure relates to a simple, strong, lightweight, and aesthetically pleasing system for mounting solar panel tiles or other tiles over surfaces, which provides suitable ventilation beneath the solar panel tiles/tiles, has the weatherproofing capability, allows easier and hidden attachment of corresponding cables and power conversion devices, prevents fire, and is easy to be manufactured, installed, repaired, and replaced.

BACKGROUND

The increasing pollution and limited non-renewable sources available have led the world to switch towards renewable sources of energy. Solar energy is one such renewable energy that is easily available everywhere. Earlier, only industries, power sectors and government were using solar panels for harvesting solar energy, which was then transmitted to households and other infrastructures. However, due to the increase in energy demand and limited area available for installing solar panels, nowadays, general people are also installing solar panels on their private building structures.

Solar panels or photovoltaic (PV) modules are generally deployed in a wide variety of ways, including deployment over the roofs, sheds, and balconies of buildings, including private homes, commercial structures, and offices. However, these panels are not readily capable of being integrated onto roof structures being constructed of standard roofing materials. This limits the usage of solar panels in a variety of locations where solar energy could otherwise be collected.

The existing system of installation of solar panels over residential rooftops involves the usage of elevated steel structures or sections for mounting the solar panels, which shows the solar panel system as a separate entity and not a part of the roof. Besides, the module size, shape, and color of the solar panels do not match with that of the roof and this leads to poor aesthetics. In addition, the existing system is not leakproof or weatherproof and they fail to protect the roof beneath the solar panels from wind, rain, snow, dust, and other external conditions.

Besides, another major drawback associated with existing mounting systems is the high weight of the overall mounting system or structure, which can put a load on the roof and can permanently damage the roof as well as the whole building structure. Further, it is difficult to install the solar panels over inclined surfaces, as the existing mounting systems involve or require additional structural materials for creating the mounting platform in an upward erected manner over the inclined surfaces, and also require skilled personnel to install the same. This again further increases the overall weight, and cost of the mounting system or structure due to the use of additional structural materials and manpower. Furthermore, there are chances of water entering beneath the tiles or mounting system from sideways, and the main aesthetics of the inclined surface of the structure is also lost due to the mounting structure.

In addition, since the roof remains covered by the solar panels, the temperature beneath the solar panels also rises significantly, thereby affecting the performance of solar panels and corresponding cables, and devices, and also increase the temperature inside the buildings. In severe heat conditions, the increased temperature beneath the solar panels might also completely damage the solar panel system. Also, the existing system does not have a fire-resistant capability, which makes it vulnerable to increased heat conditions or fire. In the worst case, any starting of a fire in the solar panels or the existing system may also lead to a fire breakout over the roof as well as inside the corresponding building.

Further, in the existing system, the corresponding cables and devices of the solar panels remain outside and exposed to the external environment, which may significantly damage them. Also, the existing system is difficult to be manufactured, installed, repaired and replaced due to the involvement of a large number of components, which consumes time and requires skilled personnel for the installation and repair.

Therefore, there is a need in the art to develop a simple, lightweight yet strong system or mechanism for mounting solar panel tiles or other tiles over surfaces, which has the weatherproofing capability, increases the performance of the solar panels by providing suitable ventilation and natural cooling, allows easier and hidden attachment of corresponding cables and power conversion devices, prevents fire, is easy to manufacture, install, repair, and replace, and fulfills the aesthetics that the consumers expect.

OBJECTS OF THE PRESENT DISCLOSURE

Some of the objects of the present disclosure, which at least one embodiment herein satisfies are as listed herein below.

It is an object of the present disclosure to provide a simple, lightweight, and strong system for mounting solar panel tiles or other tiles over a roof or other surfaces. Solar panel tiles herein are also referred to as solar tiles, which are frameless solar panels.

It is an object of the present disclosure to provide a simple, strong, lightweight, and efficient system for mounting solar panel tiles or other tiles over a flat as well as inclined roof or other surfaces It is an object of the present disclosure to provide an aesthetically pleasing system for mounting solar panel tiles or other tiles over a roof or other surfaces, which shows the solar panels as a part of the roof and not as a separate addon entity, and fulfills the aesthetics that the consumers expect It is an object of the present disclosure to provide a system for mounting solar panel tiles or other tiles over a roof or other surfaces, which is easy and affordable to be manufactured, installed, repaired, and replaced, without the involvement of skilled personnel.

It is an object of the present disclosure to provide a simple, strong, lightweight, efficient, and aesthetically pleasing system for mounting solar panel tiles or other tiles over a roof or other surfaces, which provides proper ventilation beneath the assembly to facilitate convection cooling at the rear side or beneath the tiles.

It is an object of the present disclosure to provide a fireproof system for mounting solar panel tiles or other tiles over a roof or other surfaces.

It is an object of the present disclosure to provide a system for mounting solar panel tiles or other tiles over a roof or other surfaces, which is structurally stable, and less prone to structural failure due to uplift forces.

It is an object of the present disclosure to provide a system for mounting solar panel tiles or other tiles over a roof or other surfaces, which has waterproofing capability and also protects the assembly and roof from external weather conditions.

SUMMARY

The present disclosure relates to a simple, lightweight, strong, and aesthetically pleasing system for mounting solar panel tiles or other tiles over surfaces, which provides suitable ventilation beneath the solar panel tiles/tiles, has weatherproofing capability, allows easier and hidden attachment of corresponding cables and power conversion devices, prevents fire, and is easy to be manufactured, installed, repaired, and replaced.

According to an aspect of the present disclosure, the system may comprise base frames (footages) comprising C-shaped grooves at two opposite ends of the frame and facing each other. The frames may be adapted to be removably configured over a surface of an area of interest (AOI) such that two adjacent mounting frames are extending parallelly and spaced apart by a predefined distance therebetween based on a dimension of tiles to be mounted thereon. The AOI may be a roof or a surface, and the tiles may be solar panel tiles, glass panels, or other aesthetic panels.

Further, Z-shaped clamps may be attached at a bottom surface near one end of the tiles, and an EPDM rubber may be attached at least at one of the edges of the tiles to form a corresponding tile assembly. The C-shaped grooves may be provided with a spring-lock mechanism comprising a flat spring attached to the grooves using a spring fixing bracket. The spring may be adapted to be pressed upon application of a predefined pressure during insertion of one end of the tile (where the clamp is not present) in one of the C-shaped grooves at the time of mounting the tile assembly on the frames. This may allow the Z-shaped clamp of the tile assembly to move inside the other opposite C-shaped groove of the frame. Once the tile assembly is positioned in the two C-shaped grooves, the springs may again retract to their original position and may lock the tile assembly over the frames.

In an aspect, the frames may comprise a set of bar holes and a set of grooves. A set of the reference bars or tie supports may pass through a row of the parallelly placed frames through the corresponding bar holes and/or the bar grooves, to allow parallel positioning of the frames and provide stability and support to the system. Finally, the tile assembly may be mounted over the frames. This makes the system aesthetically pleasing, which shows the solar panels or tiles as a part of the roof and not as a separate addon entity, and fulfills the aesthetics that the consumers expect.

Further, two adjacent rows of the multiple parallelly placed frames may be configured over the surface using the set of the reference bars such that at least one of the reference bars passes through the set of bar holes associated with the frames of one of the adjacent rows, and the set of bar grooves associated with the frames of the other adjacent row. This may allow multiple rows of tiles to be mounted over the surface.

In an aspect, the frames may have a U-shaped rectangular groove on a top surface and having a slanting profile at one of the ends (say rear end). Further, the tile may have one C-shaped groove at the front end, and two C-shaped grooves at the rear end (where the clamp of the tile is mounted) with a gap between therebetween. Further, the system may comprise an EPDM gasket adapted to configured in the U-shaped rectangular groove of the frames such that one end of the gasket is at the front end of the frame, and another end of the gasket extends through the gap between the two C-shaped grooves provided at the rear end of the corresponding frame. The slanting profile of the frame may allow water or snow to ingress and not deposit over the tiles, and the EPDM gasket and the EPDM rubber of the tile assemblies may act as a sealing means, which makes the system leak-proof and weather-resistant. The gasket and the rubber of the tiles may also act as a cushioning means, which may provide support to the tile assembly, and prevents the tiles from damages due to external load.

In an aspect, the frames may be made of high-density polypropylene (HDPE), and the reference bars may be made of PVC, which makes the system lightweight, yet strong, and easy to be manufactured. Besides, the use of a minimal number of easily available and affordable components in the system, makes it easy and affordable to be installed, repaired, and replaced, without the involvement of skilled personnel.

In an aspect, the frames may comprise a plurality of vents that may allow air to flow therethrough. This provides proper ventilation beneath the assembly, thereby facilitating convection cooling at the rear side or beneath the tiles. Further, the vents may allow cables to pass therethrough to keep the cables hidden beneath the tiles to keep the cables hidden beneath the assembly, and making the system aesthetically pleasing.

In an aspect, each of the frames may comprise a ser of fixing holes configured to allow coupling of the frames over the surface using one or more fixtures selected from any or a combination of bolt, screw, and clamps. Further, the spring-lock mechanism of the frames allows easier coupling as well as easier replacement of the tiles from the frames as required.

In another aspect, the frames, the bars, the clamps, and other components of the system may be made of a material selected from metals, fire-retardant plastics, and fire-retardant materials. Further, a fire-resistant underlayment and a gypsum board may be configured over the surface of the AOL and the system may be configured there over to improve the fire resistance capability of the system.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
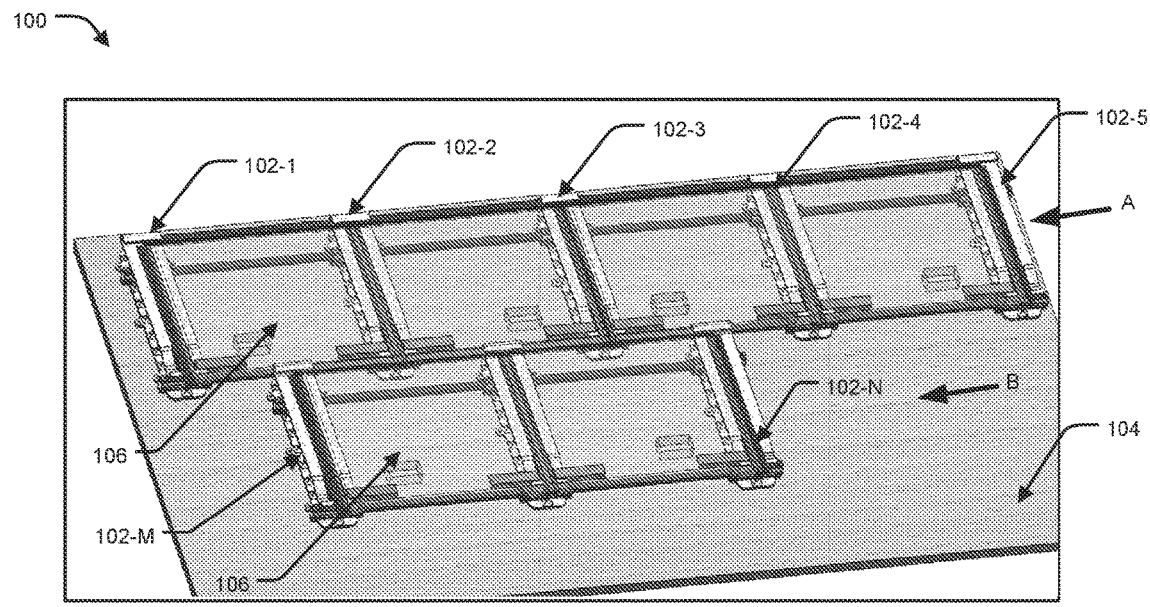
FIG. 1A illustrates an exemplary view of the proposed system for mounting a row of tiles over a surface, in accordance with an embodiment of the present disclosure.
Figure 1B:
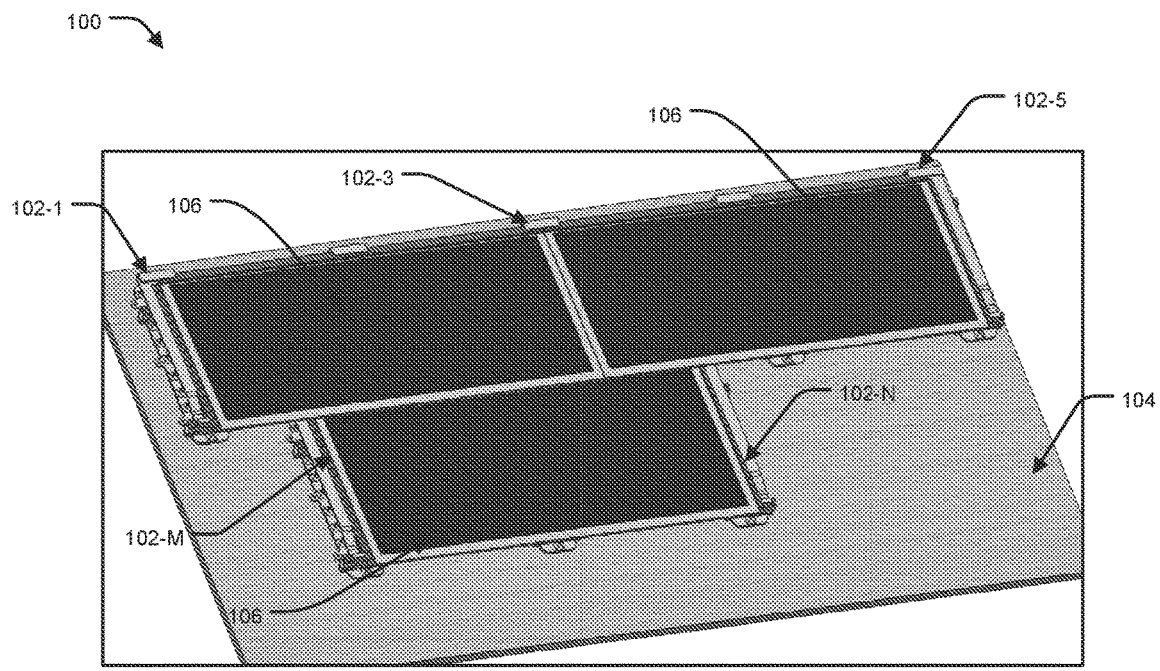
FIG. 1B illustrates an exemplary view of the proposed system of FIG. 1A having a row of PV tiles mounted there over.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates to the field of panel mounting systems. More particularly, the present disclosure relates to a simple, lightweight, strong, and aesthetically pleasing system for mounting solar panel tiles or other tiles over surfaces, which provides suitable ventilation beneath the solar panel tiles/tiles, has weatherproofing capability, allows easier and hidden attachment of corresponding cables and power conversion devices, prevents fire, and is easy to be manufactured, installed, repaired, and replaced.

According to an aspect, the present disclosure elaborates upon a system for mounting tiles over a surface. The system can include at least two frames, each including a C-shaped groove configured at a first end and a second end of the corresponding frames. The at least two frames can be adapted to be removably configured over a surface such that two adjacent frames among the at least two frames are extending parallelly and spaced apart by a predefined distance therebetween based on a dimension of one or more tiles to be mounted thereon. In addition, one or more Z-shaped clamps can be coupled at predefined positions on a bottom surface at a first end of each of the one or more tiles to form a corresponding tile assembly. Further, the system can include a spring-lock mechanism configured with each of the C-shaped grooves of the at least two frames. The spring-lock mechanism can be adapted to facilitate mounting and locking of the tile assembly in the at least two frames such that the one or more Z-shaped clamp at the first end of the tile assembly is engaged with the C-shaped groove at the first end of the two adjacent frames, and a second end of the corresponding tile assembly is engaged with the C-shaped groove at the second end of the two adjacent frames.

In an embodiment, the spring-lock mechanism can include a spring configured with each of the C-shaped grooves. The spring can be adapted to be pressed upon application of a predefined pressure during mounting of the second end of the tile assembly in the C-shaped grooves on the second end of the two adjacent frames, which facilitates mounting and locking of the one or more Z-shaped clamp of the corresponding tile assembly in the C-shaped groove at the first end of the two adjacent frames.

In an embodiment, the spring can be a flat spring having a first set of notches, which is adapted to be coupled to the C-shaped groove using a spring fixing bracket. The spring and the spring fixing bracket are made of SS-304 material. Further, the spring fixing bracket can include a flat strip having edges hem bent to facilitate coupling of the spring fixing bracket with a second set of notches provided on the C-shaped groove, and a set of slots that engages with and holds the first set of notches of the flat spring to facilitate coupling of the flat spring to the spring fixing bracket.

In an embodiment, each of the at least two frames can include a plurality of vents that facilitate any or a combination of allowing air to flow therethrough to keep the bottom of the one or more tiles cool, and allowing one or more cables to pass therethrough to keep the one or more cables beneath the one or more tiles.

In an embodiment, each of the at least two frames can include a U-shaped rectangular groove on a top surface and having a slanting profile extending from the first end towards the second end of the corresponding frame. Further, one C-shaped groove can be at the second end of the frame, and two C-shaped grooves can be at the first end of the frame with a gap therebetween.

In an embodiment, the system can include a gasket adapted to configured in the U-shaped rectangular groove of the at least two frames such that one end of the gasket is at the second end of the corresponding frame, and another end of the gasket extends through the gap between the two C-shaped grooves provided at the first end of the corresponding frame. Further, rubber can be attached at least at one of the edges of the one or more tiles. The gasket and the rubber can be made of a sealing material selected from silicone rubber, EPDM, and neoprene, which can provide support to the tile assembly, can prevent the one or more tiles from damages due to external load, and can make the system leak-proof and weather-resistant.

In an embodiment, each of the at least two frames can include a set of bar holes, and a set of bar grooves, which can be adapted to allow a longitudinal support bar to pass therethrough. Further, a set of the reference bars can pass through a row of the parallelly placed frames through any or a combination of the corresponding bar holes, and the bar grooves, to provide stability and support to the system.

In an embodiment, two or more adjacent rows of the at least two frames can be configured parallel and adjacent to each other over the surface using the set of the reference bars such that at least one of the reference bars passes through the set of bar holes associated with the frames of one of the adjacent rows, and the set of bar grooves associated with the frames of the other adjacent row.

In an embodiment, the at least two frames can be made of a first material selected from high-density polyethylene (HDPE), metals, fire-retardant plastics, and fire-retardant materials. The reference bar can be made of a second material selected from Polyvinyl chloride (PVC), metals, fire-retardant plastics, and fire-retardant materials. Further, any or a combination of a fire-resistant underlayment and a gypsum board can be configured over the surface, and the system can be configured there over to improve the fire resistance capability of the system.

Referring to FIGS. 1A, 1B, and 10A to 10F, according to an aspect, the proposed system 100 can include multiple frames 102-1 to 10N-N (collectively referred to as frames 102 or footages 102, herein) being removably configured over an area of interest (AOI) on a surface 104 such that two adjacent frames among the frames 102 are extending parallelly and spaced apart by a predefined distance therebetween along a row (A or B), based on a dimension of one or more tiles 106 to be mounted thereon. Further, multiple rows A, B of parallelly placed frames 102 can be configured over the surface 104 as per the requirement of users. Accordingly, once the rows of the frames 102 are mounted over the surface 104, the tiles 302 or the corresponding tile assemblies 106 can be mounted over the frames 102. The AOI 104 can be a roof or a surface, and the tiles 302 can be solar panel tiles (photovoltaic tiles), glass panels, or other aesthetic panels, but not limited to the likes.

Figure 3A:
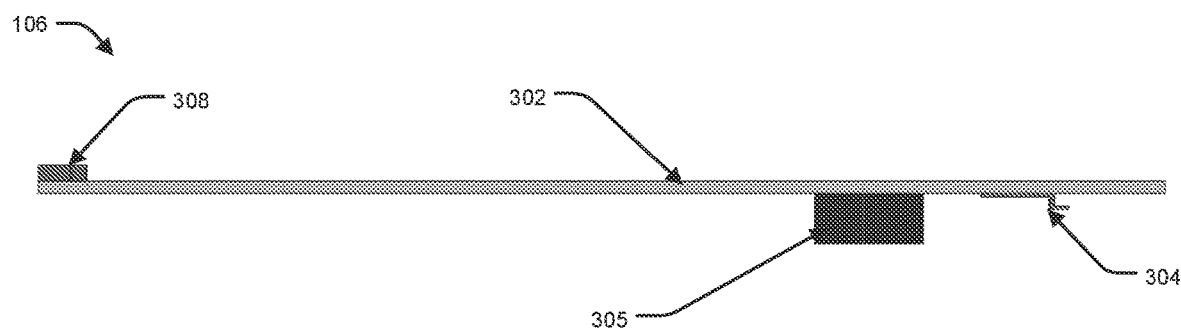
FIGS. 3A to 3C illustrate exemplary views of the tile assembly of the proposed system in accordance with an embodiment of the present disclosure
Figure 3B:
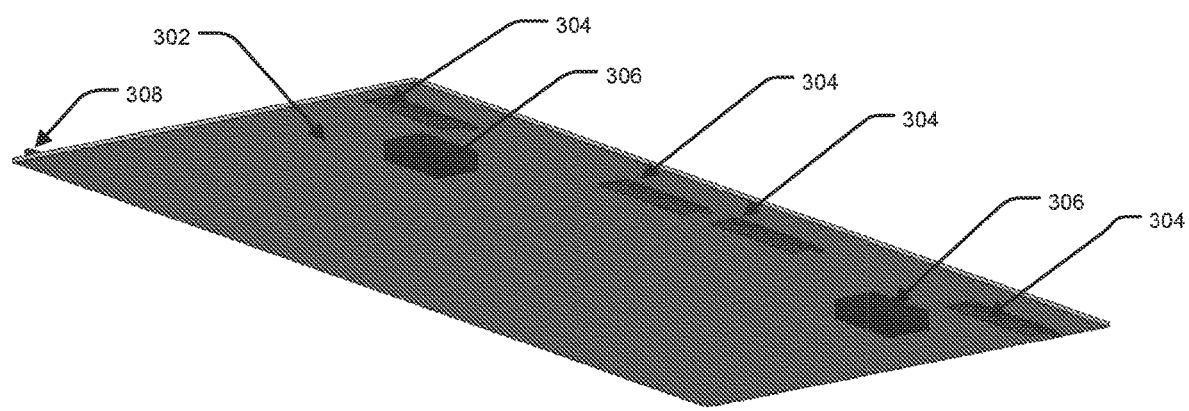
Figure 3C:
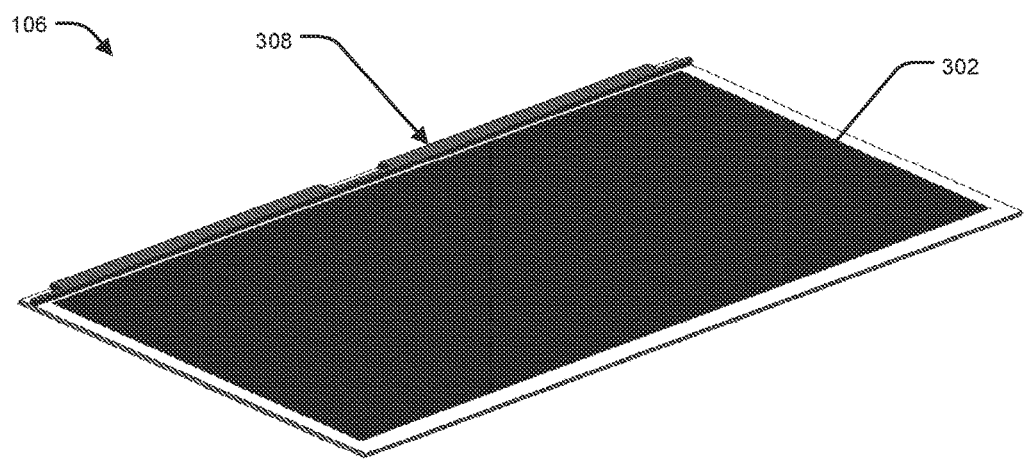
Figure 9:
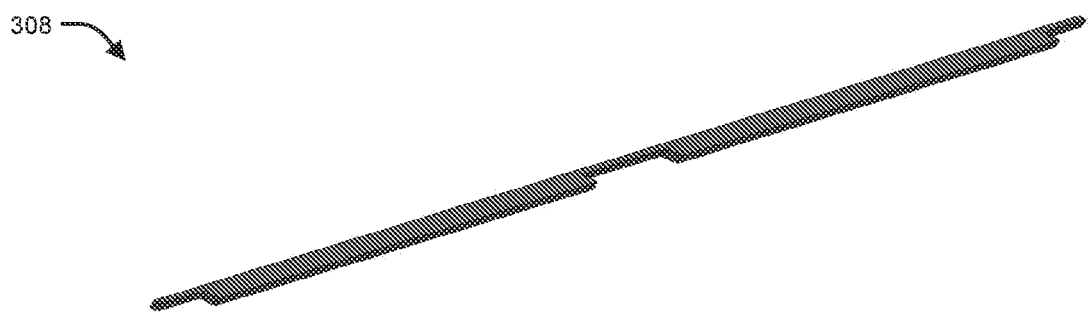
FIG. 9 illustrates an exemplary view of the EPDM rubber of the tile assembly in accordance with an embodiment of the present disclosure.
Figure 10B:
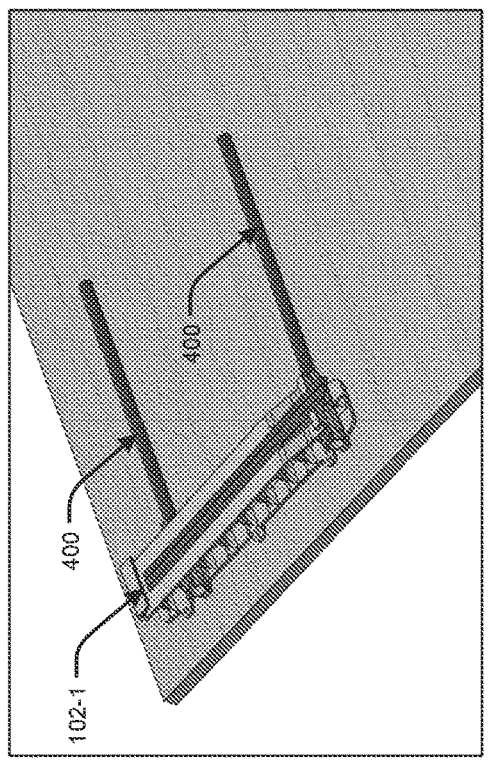
FIGS. 10A to 10F illustrate exemplary views showing a step-wise configuration of the proposed system over the surface to form the system of FIGS. 1A and 1B in accordance with an embodiment of the present disclosure.
Figure 10D:
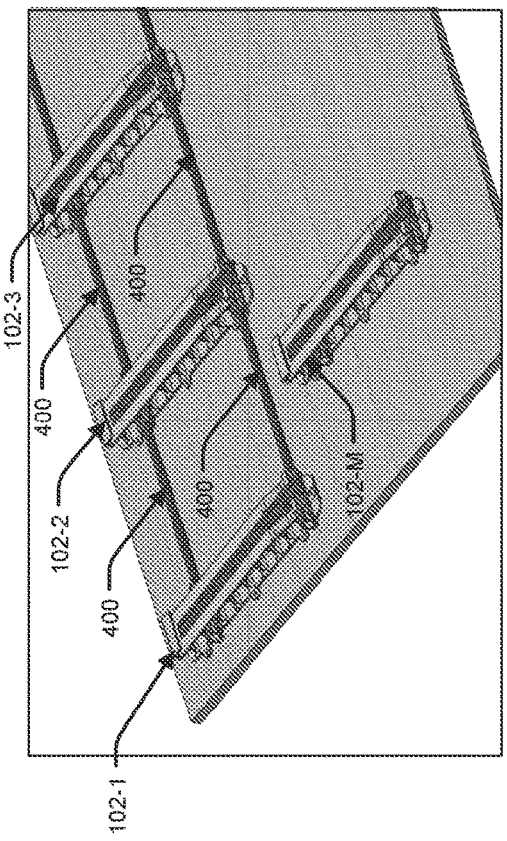
Figure 10A:
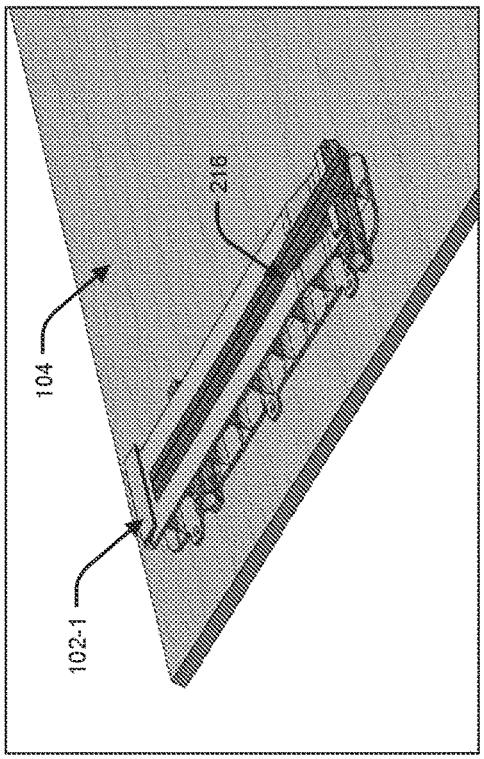
Figure 10C:
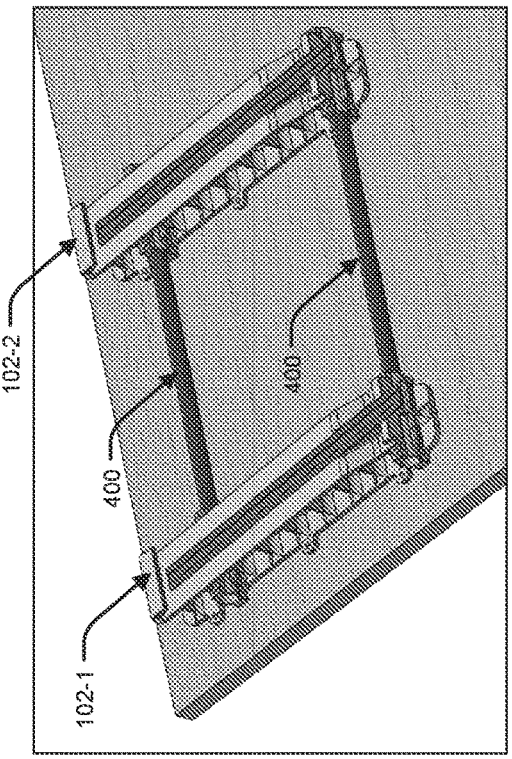
Figure 10E:
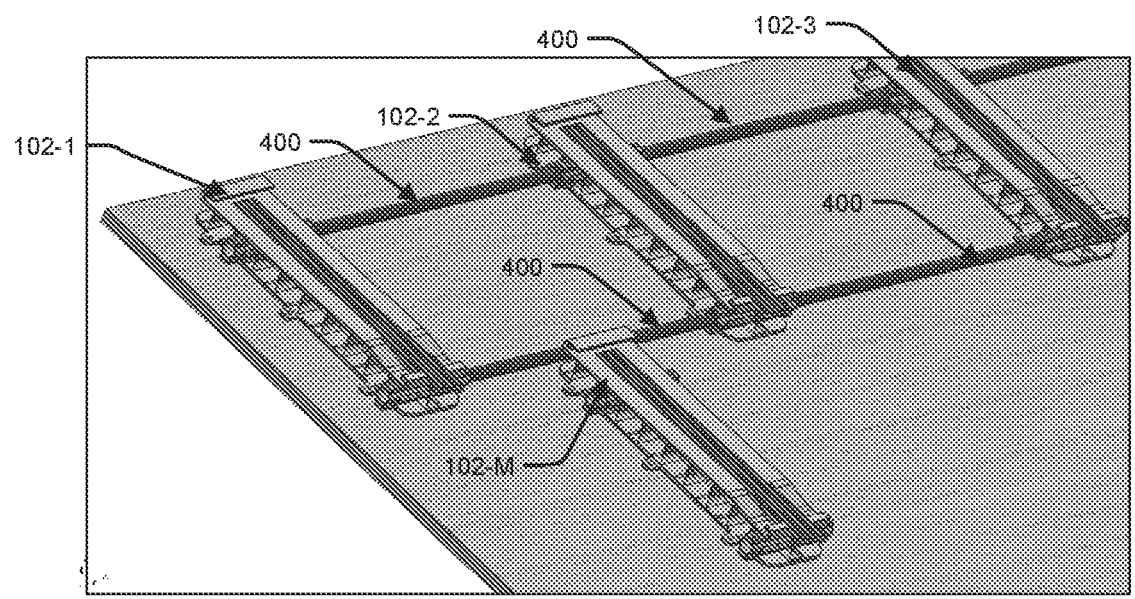
Figure 10F:
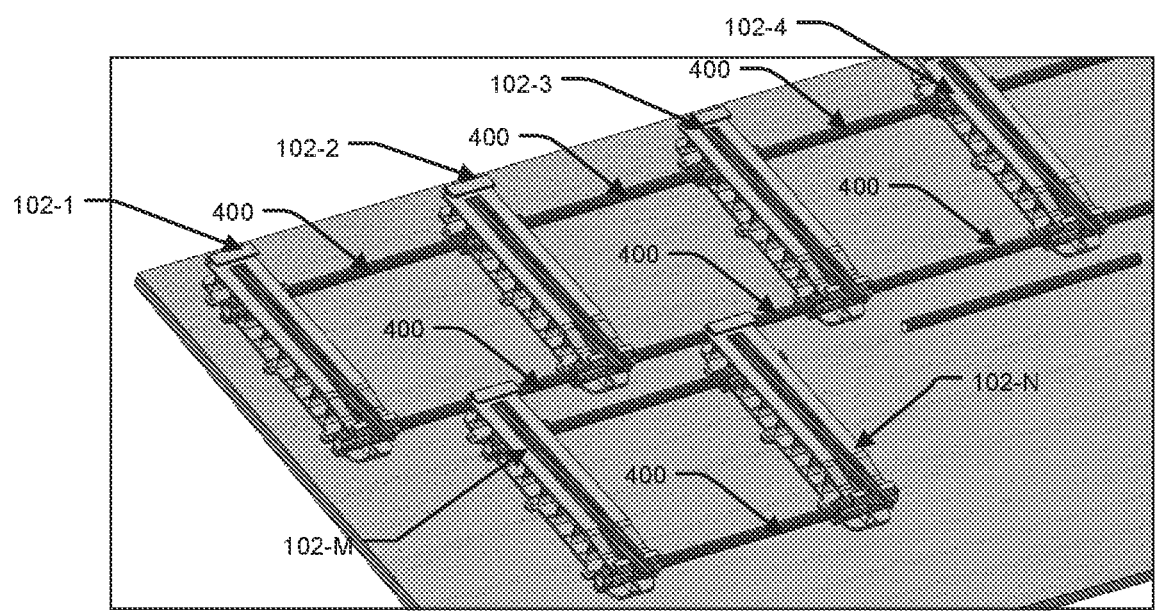

In an embodiment, referring to FIGS. 3A to 3C, one or more Z-shaped clamp 304 can be coupled at predefined positions on a bottom surface at the first end of each of the tiles 302, and an EPDM rubber 308 as shown in FIG. 9 can be attached at least at one of the edges of the tiles 302 to form the corresponding tile assembly 106. In an exemplary embodiment, when the tiles 302 to be mounted is photovoltaic (PV) tiles, the bottom surface of the PV tiles can have the corresponding power electronic system 308 attached to the bottom surface of the tile assembly 106, which keeps them hidden and aesthetically pleasing.

In an embodiment, the frames 102 can include C-shaped grooves 202-1 to 202-3 (collectively referred to as C-shaped grooves 202, herein) at both the ends of the frame 102 such that the C-shaped grooves (202-1) and (202-2, 202-3) on the two opposite ends are facing each other. As illustrated in FIGS. 2A to 2E, the second end of the frame 102 can have one C-shaped groove 202-1, and the first end (opposite to the second end) of the frame 102 can have two C-shaped grooves 202-1, 202-3 having a gap therebetween. In addition, the frame 102 can include a U-shaped rectangular groove 204 over an upper surface and extending between the two ends of the frame 102. The frame 102 can have a slanting profile 206 at the second end near the C-shaped grooves 202-2 and 202-3.

In an embodiment, an EPDM gasket 216 can be configured in the U-shaped rectangular groove 204 of the frames 102 such that one end of the gasket 216 is at the second end of the corresponding frame 102, and another end of the gasket 216 extends through the gap between the two C-shaped grooves 202-2 and 202-3 provided at the first end of the corresponding frame 102. The gasket 216 can be a flat rubber having a curve bottom profile based on the U-shaped groove 204 of the frame 102, and a rectangular profile with a groove at the top, which can prevent rainwater, and snow water to settle over the system 100.

In another embodiment, the gasket 216 and the rubber 308 of the tile assembly 106 can also be made of a material selected from silicone rubber, and neoprene, and the likes, which can provide support to the tile assembly 106, can prevent the tiles 302 from damages due to external load, can protect the rain and snow Ingres, and can make the system leak-proof and weather-resistant.

Figure 2A:
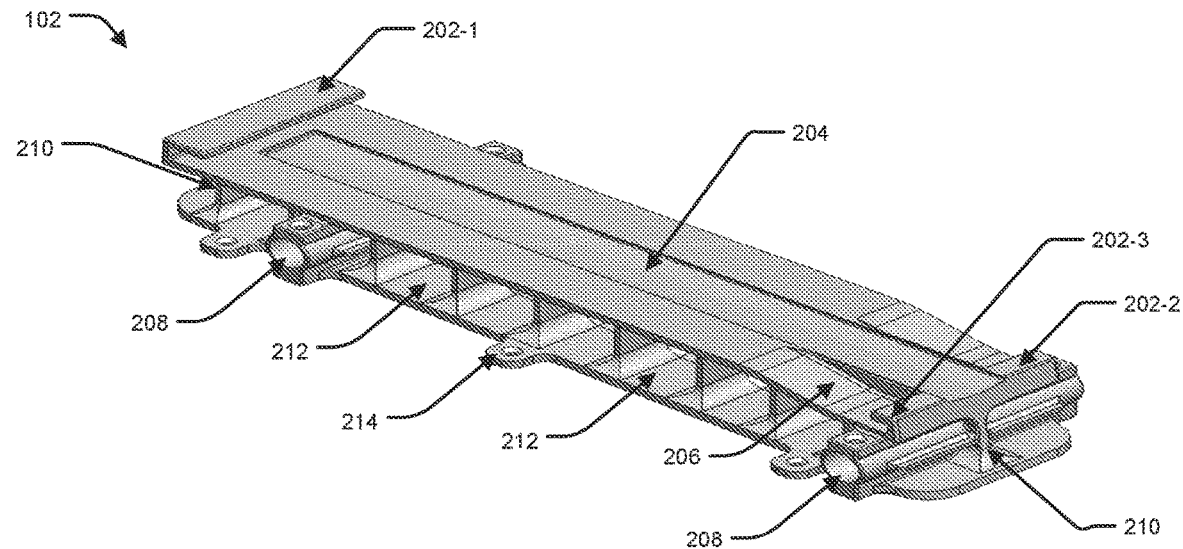
FIGS. 2A and 2B illustrate exemplary views of the frame of the FIG. 1A.
Figure 2B:
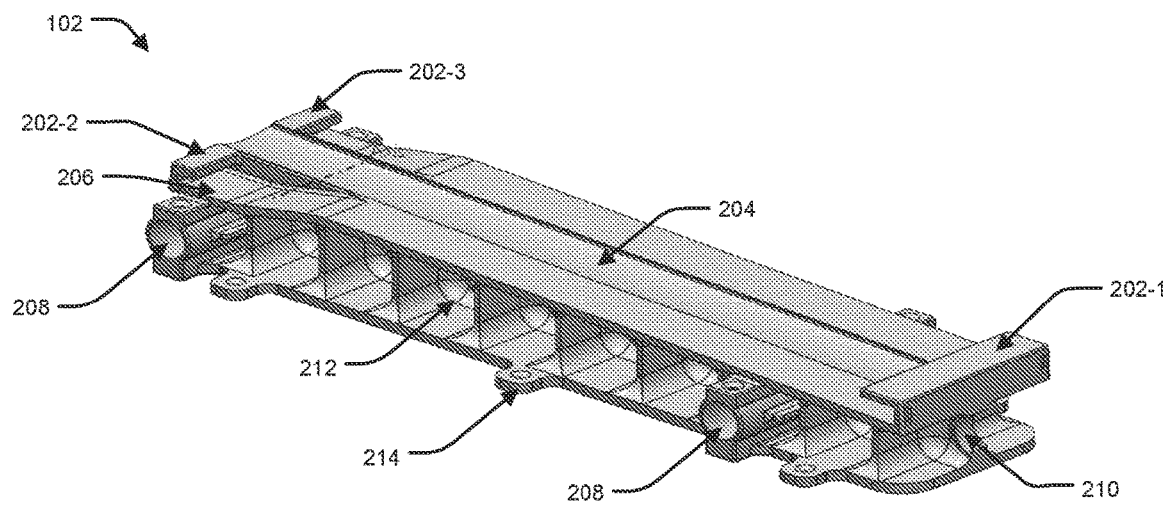
Figure 2C:
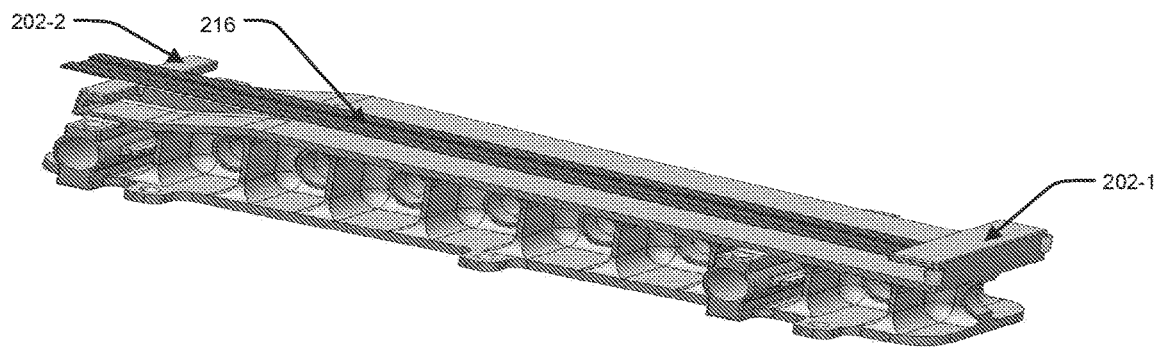
FIGS. 2C to 2E illustrate exemplary views of the frame of the FIGS. 2A and 2B having a gasket and a spring-lock mechanism configured over the frame.
Figure 2D:
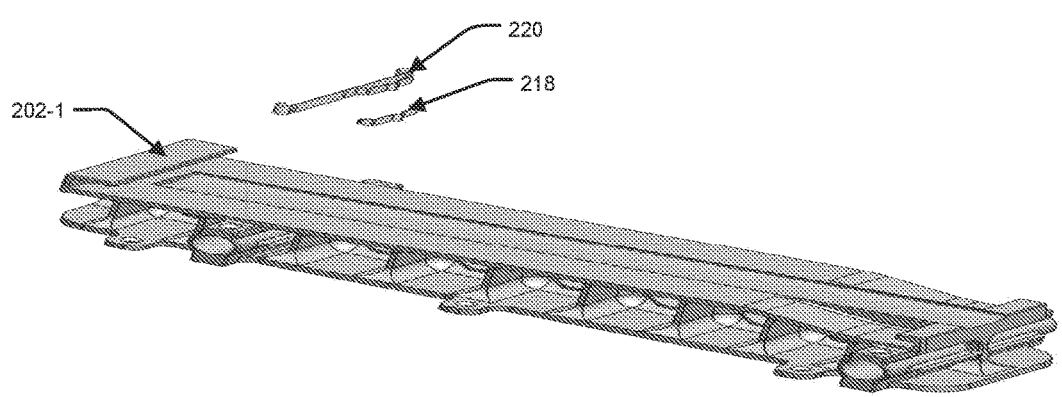
Figure 2E:
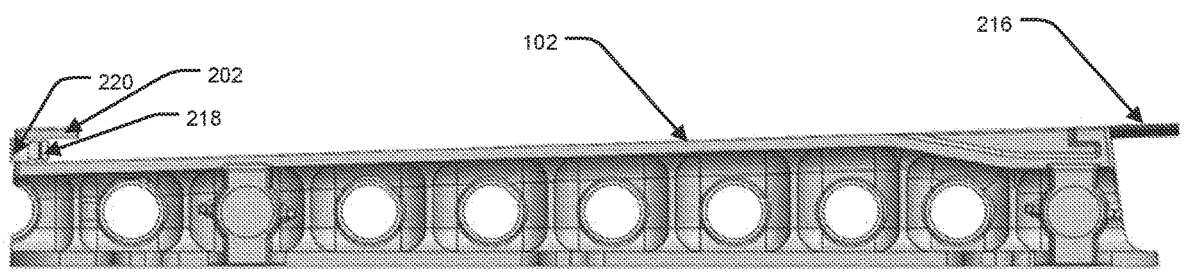

The C-shaped grooves 202 of the frames can be configured with a spring-lock mechanism as shown in FIGS. 2C to 2E, which can be adapted to facilitate mounting and locking of the tile assembly 106 in the frames 102 such that the Z-shaped clamp 304 at the first end of the tile assembly 106 is engaged with the C-shaped groove 202-2 and 202-3 at the first end of two adjacent frames 102, and a second end of the corresponding tile assembly 106 is engaged with the C-shaped groove 202-1 at the second end of the adjacent frames 102. As illustrated, the spring-lock mechanism can include a spring 218 configured with each of the C-shaped grooves 202. The spring 218 can be adapted to be pressed upon application of a predefined pressure during insertion of one end of the tile assembly 106 (where the clamp is not present) in one of the C-shaped grooves 202-1 at the time of mounting the tile assembly 106 on the frames 102. This can allow the Z-shaped clamp 304 of the tile assembly 106 to move inside the other opposite C-shaped grooves 202-2 or 202-3 of the frame. Once the tile assembly 106 is positioned in the two C-shaped grooves 202-2 and 202-3, the spring 218 can again retract to their original position and can lock the tile assembly 106 over the frames 102.

Figure 7:
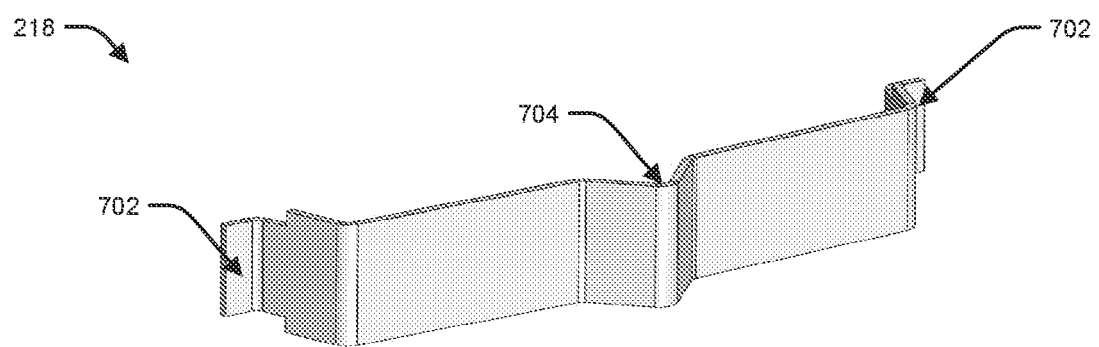
FIGS. 7 and 8 illustrates exemplary view of the flat spring, and spring fixing bracket, respectively, of the proposed system in accordance with an embodiment of the present disclosure.
Figure 8:
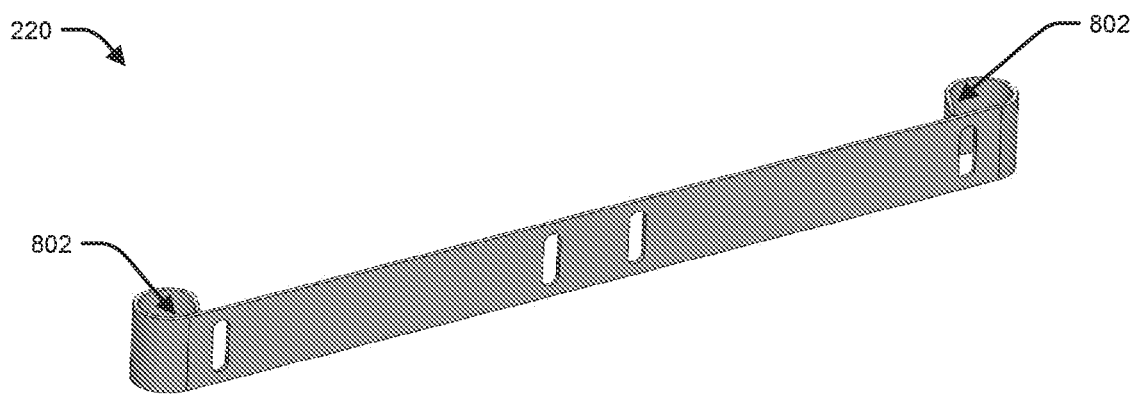

In an exemplary embodiment, the spring 218 of the spring-lock mechanism can be a flat spring as shown in FIG. 7, having a first set of notches 702 at either ends, which can be adapted to be coupled to the C-shaped groove 202 using a spring fixing bracket 220 as shown in FIG. 8. The spring 218 and the spring fixing bracket 220 can be made of SS-304 material, which is highly heat-resistant grade and offers good corrosion resistance to many chemical corrodents, as well as industrial atmospheres. The spring fixing bracket 220 can be a flat strip having edges hem bent as 802 to facilitate coupling of the spring fixing bracket 220 with a second set of notches provided on the C-shaped grooves 202, and can further include a set of slots that can engage with and can hold the first set of notches 702 of the flat spring 218 to facilitate coupling of the flat spring 218 to the spring fixing bracket 220

Figure 4:
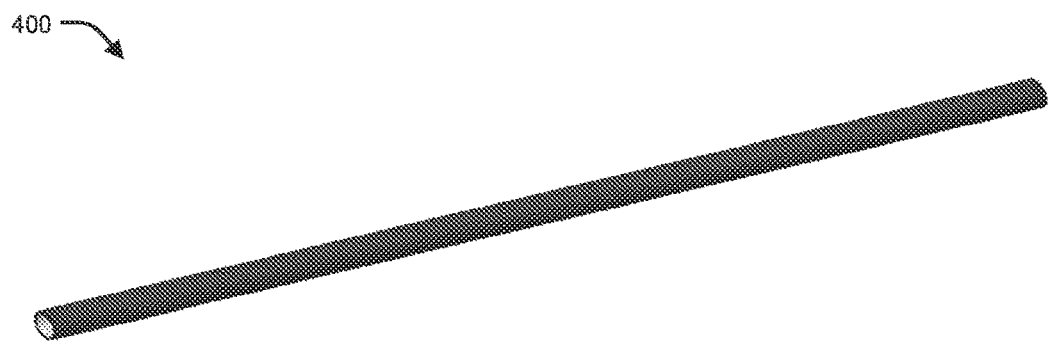
FIG. 4 illustrates an exemplary view of the reference rod of the proposed system in accordance with an embodiment of the present disclosure.
Figure 5:
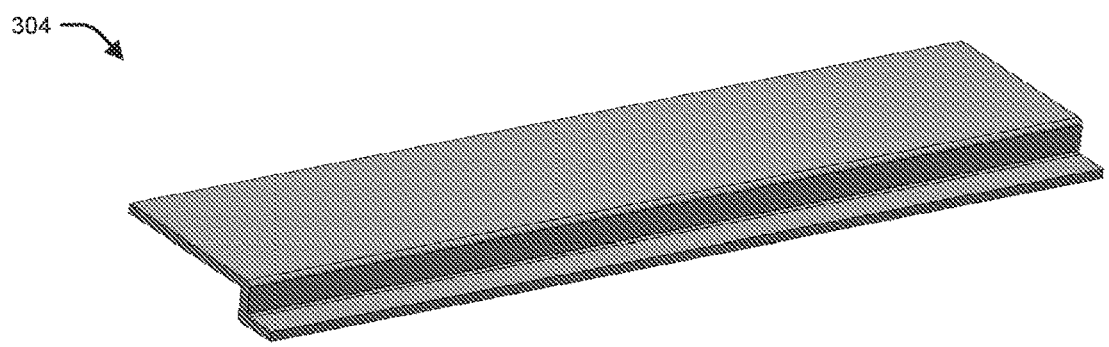
FIG. 5 illustrates an exemplary view of the Z-shaped clamp of the proposed system in accordance with an embodiment of the present disclosure.
Figure 6:
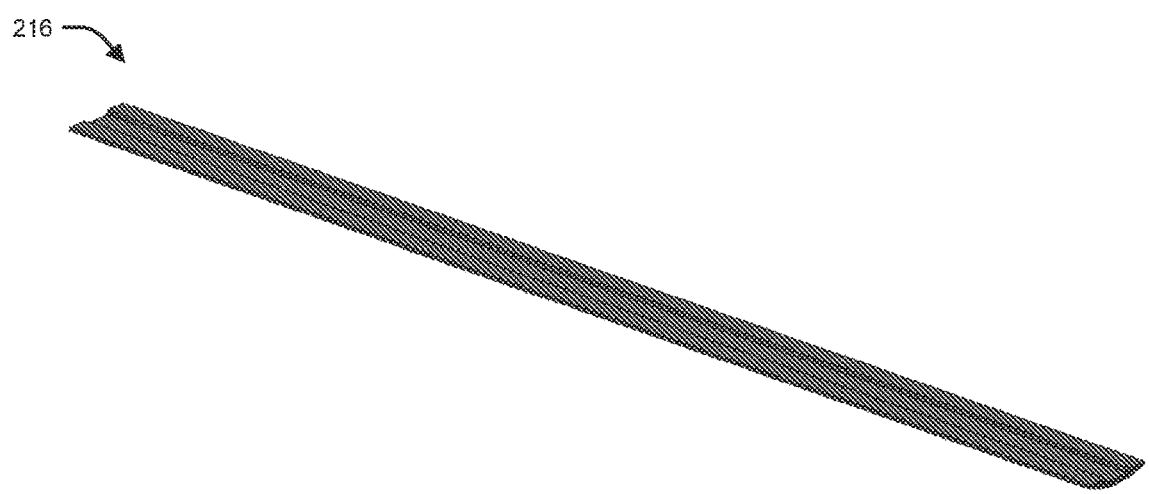
FIG. 6 illustrates an exemplary view of the EPDM gasket of the proposed system in accordance with an embodiment of the present disclosure.

In an embodiment, the frames 102 can be provided with a set of bar holes 208 extending perpendicular from the length of the frames 102, and can further include a set of bar grooves 210 on extreme ends of the frames 102. The bar holes 208 and the bar grooves 210 can allow a set of longitudinal reference bars 400 (also referred to as support tie 400) as shown in FIG. 4, to pass therethrough, which can allow the user to parallelly place and mount the frames 102 over the surface 104 such that two adjacent frames (102-1 and 102-2 or 102-2 and 102-2 or 102-3 or 102-4, and so on) are separated by the predefined distance. Similarly, two or more adjacent rows A and B of the frames 102 can be configured parallel and adjacent to each other over the surface 104 using the set of the reference bars 400 such that at least one of the reference bars 400 passes through the bar holes 208 associated with the frames (102-1 and 103-2) of one of the adjacent rows A, and the bar grooves 210 associated with the frames 102-M of the other adjacent row B as shown in FIGS. 10A to 10F. The above arrangement can provide additional stability and support to the system 100.

In an embodiment, frames 102 can include a plurality of vents 212 that can allow air to flow therethrough to keep the bottom of the tile assembly 106 cool, and can further allow one or more cables to pass therethrough to keep the one or more cables hidden beneath the tile assembly 106.

In an embodiment, frames 102 can include a ser of fixing holes 214 configured to allow coupling of the frames 102 over the surface 104 using one or more fixtures selected from any or a combination of bolt, screw, and clamps, but not limited to the likes.

Referring to FIGS. 5, and 3A to 3C, the Z-shaped clamp 304 of the tile assembly 106 can include an upper section adapted to be coupled to the bottom surface of the tiles 302 to form the corresponding tile assembly 106, and a lower section adapted to engage and lock with the C-shaped groove 202-1 and 202-3 to facilitate coupling of the corresponding tile assembly 106 to the frames 102. The upper section and the lower section extend perpendicularly from two opposite ends of a common middle section in opposite directions.

In an exemplary embodiment, the frame 102 can be made of High-density polyethylene (HDPE) resins that are well suited for a range of blow, injection, and rotational molding applications. The tensile strength of HDPE is very high and can withstand heavier loads than most of the other types of polyethylene. In addition, the reference bar 400 can be made of PVC material having high hardness and mechanical properties. The mechanical properties of rigid PVC (uPVC) are very good; and have an elastic modulus that can reach 1500-3,000 MPa. Further, the PVC material can be provided with a thermal stabilizer during manufacturing to enhance the heat withstanding capability of the reference bars. Further, a fire-resistant underlayment and a gypsum board can be configured over the surface 104 of the AOI, and the system 100 can be configured there over to improve the fire resistance capability of the system 100.

The use of the above lightweight, yet strong and thermal resistant materials in the frames 102, and the reference bars 400, makes the proposed system lightweight yet strong, and resistant to heat and fire compared to the existing mounting mechanisms or systems.

Besides, the above configuration of the proposed system 100 makes it aesthetically pleasing, which shows the solar panels or tiles 106 or 302 as a part of the roof 104 and not as a separate addon entity, fulfilling the aesthetics that the consumers expect, and further protecting the system 100 as well as the roof 104 from external weather conditions such as rain, snow, dust, and other conditions Besides, the use of a minimal number of easily available and affordable components in the system 100, makes it easy and affordable to be installed, repaired, and replaced, without the involvement of skilled personnel Those skilled in the art would appreciate that embodiments of the present disclosure utilize various novel and inventive features by providing a simple, lightweight yet strong system for mounting solar panel tiles or other tiles over surfaces, which has the weatherproofing capability, increases the performance of the solar panels by providing suitable ventilation, allows easier and hidden attachment of corresponding cables and power conversion devices, prevents fire, is easy to install, repair, and replace, and fulfills the aesthetics that the consumers expect.

Further, it is to be appreciated by a person skilled in the art that while various embodiments and drawings of the present disclosure have been elaborated by considering five frames along a row, a total of 2 rows of the tiles, up to six glass panels or 3 PV tiles, however, the number of the frames, the rows of tiles, and the number of tiles, are not just limited to the given number but can be of any number based on the requirement of the user, and all such embodiments are well within the scope of the present disclosure.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

Advantages of the Present Disclosure

The present disclosure provides a simple, lightweight, and strong system for mounting solar panel tiles or other tiles over a roof or other surfaces.

The present disclosure provides a simple, lightweight, and strong system for mounting solar panel tiles or other tiles over a flat as well as inclined roof or other surfaces The present disclosure provides an aesthetically pleasing system for mounting solar panel tiles or other tiles over a roof or other surfaces, which shows the solar panels as a part of the roof and not as a separate addon entity, and fulfills the aesthetics that the consumers expect The present disclosure provides a system for mounting solar panel tiles or other tiles over a roof or other surfaces, which is easy and affordable to be manufactured, installed, repaired, and replaced, without the involvement of skilled personnel.

The present disclosure provides de a simple, lightweight, strong, and aesthetically pleasing system for mounting solar panel tiles or other tiles over a roof or other surfaces, which provides proper ventilation beneath the assembly to facilitate convection cooling at the rear side or beneath the tiles.

The present disclosure provides a fireproof system for mounting solar panel tiles or other tiles over a roof or other surfaces.

The present disclosure provides a system for mounting solar panel tiles or other tiles over a roof or other surfaces, which is structurally stable, and less prone to structural failure due to uplift forces.

The present disclosure provides a system for mounting solar panel tiles or other tiles over a roof or other surfaces, which has waterproofing capability and also protects the assembly and roof from external weather conditions.

We claim:

1. A system for mounting tiles, the system comprising:
at least two frames, each comprising a C-shaped groove configured at a first end and a second end of the corresponding frames, wherein the at least two frames are adapted to be removably configured over a surface such that two adjacent frames among the at least two frames are extending parallelly and spaced apart by a predefined distance therebetween based on a dimension of one or more tiles to be mounted thereon;
one or more Z-shaped clamp coupled at predefined positions on a bottom surface at a first end of each of the one or more tiles to form a corresponding tile assembly; and
a spring-lock mechanism configured with each of the C-shaped groove of the at least two frames, wherein the spring-lock mechanism is adapted to facilitate mounting and locking of the tile assembly in the at least two frames such that the one or more Z-shaped clamp at the first end of the tile assembly is engaged with the C-shaped groove at the first end of the two adjacent frames, and a second end of the corresponding tile assembly is engaged with the C-shaped groove at the second end of the two adjacent frames.

2. The system as claimed in claim 1, wherein the spring-lock mechanism comprises a spring configured with each of the C-shaped grooves, wherein the spring is adapted to be pressed upon application of a predefined pressure during mounting of the second end of the tile assembly in the C-shaped grooves on the second end of the two adjacent frames, which facilitates mounting and locking of the one or more Z-shaped clamp of the corresponding tile assembly in the C-shaped groove at the first end of the two adjacent frames.

3. The system as claimed in claim 1, wherein the spring is a flat spring having a first set of notches, which is adapted to be coupled to the C-shaped groove using a spring fixing bracket, wherein the spring and the spring fixing bracket are made of SS-304 material; and wherein the spring fixing bracket comprises:
 a flat strip having edges hem bent to facilitate coupling of the spring fixing bracket with a second set of notches provided on the C-shaped groove, and
 a set of slots that engages with and holds the first set of notches of the flat spring to facilitate coupling of the flat spring to the spring fixing bracket.

4. The system as claimed in claim 1, wherein each of the at least two frames comprises a plurality of vents that facilitate any or a combination of:
 allowing air to flow therethrough to keep bottom of the one or more tiles cool; and
 allowing one or more cables to pass therethrough to keep the one or more cables beneath the one or more tiles.

5. The system as claimed in claim 1, wherein each of the at least two frames comprises:
 a U-shaped rectangular groove on a top surface and having a slanting profile extending from the first end towards the second end of the corresponding frame;
 one C-shaped groove at the second end; and
 two C-shaped grooves at the first end with a gap therebetween.

6. The system as claimed in claim 5, wherein the system comprises:
 a gasket adapted to configured in the U-shaped rectangular groove of the at least two frames such that one end of the gasket is at the second end of the corresponding frame, and another end of the gasket extends through the gap between the two C-shaped grooves provided at the first end of the corresponding frame; and
 a rubber attached at least at one of the edges of the one or more tiles;
 wherein the gasket and the rubber are made of a sealing material selected from silicone rubber, EPDM, and neoprene, which provides support to the tile assembly, prevents the one or more tiles from damages due to external load, and makes the system leak-proof and weather-resistant.

7. The system as claimed in claim 1, wherein each of the at least two frames comprises a set of bar holes, and a set of bar grooves, which are adapted to allow a longitudinal reference bar to pass therethrough, and wherein a set of the reference bars passes through a row of the parallelly placed frames through any or a combination of the corresponding bar holes, and the bar grooves, to provide stability and support to the system.

8. The system as claimed in claim 7, wherein two or more adjacent rows of the at least two frames are configured parallel and adjacent to each other over the surface using the set of the reference bars such that at least one of the reference bars passes through the set of bar holes associated with the frames of one of the adjacent rows, and the set of bar grooves associated with the frames of the other adjacent row.

9. The system as claimed in claim 7, wherein
 the at least two frames are made of a first material selected from high-density polyethylene (HDPE), metals, fire-retardant plastics, and fire-retardant materials;
 the reference bar is made of a second material selected from Polyvinyl chloride (PVC), metals, fire-retardant plastics, and fire-retardant materials; and
 any or a combination of a fire-resistant underlayment and a gypsum board are configured over the surface, and the system is configured there over to improve fire resistance capability of the system.

10. The system as claimed in claim 1, wherein the one or more tiles is selected from any or a combination of solar panel tile, glass panel, and roof panel, aesthetic panels, and wherein the surface is associated with an area of interest selected from a roof of a building, balcony of a building, park, and land.

* * * * *